J. T. FLIGHT.
AUTOMATIC BRAKE FOR VEHICLES.
APPLICATION FILED OCT. 10, 1911.
1,029,860.
Patented June 18, 1912.
2 SHEETS—SHEET 1.
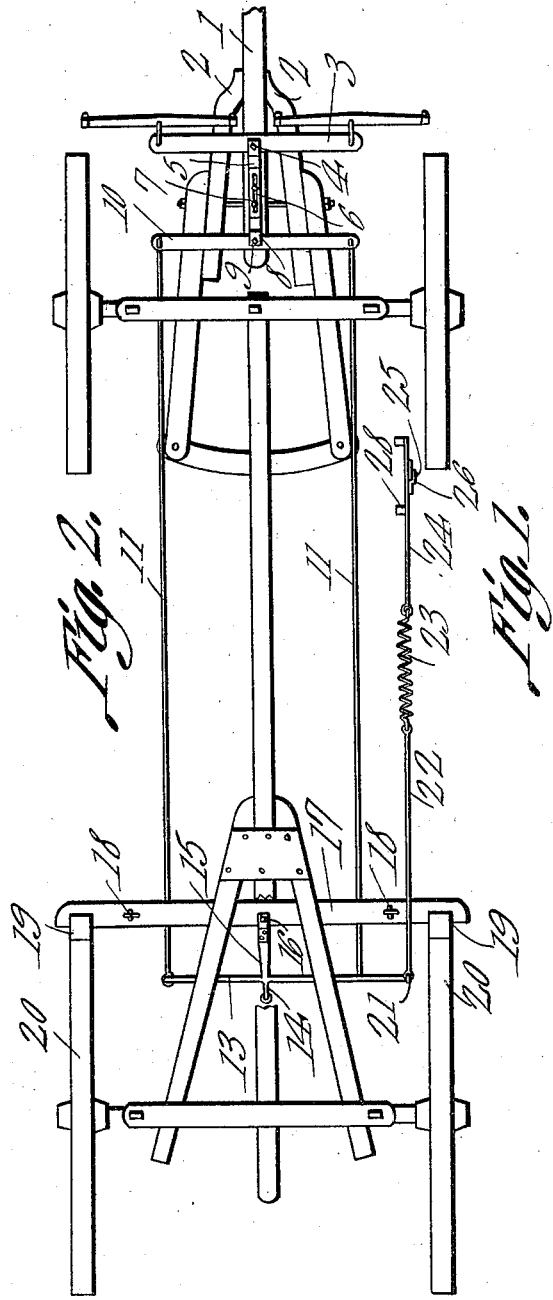
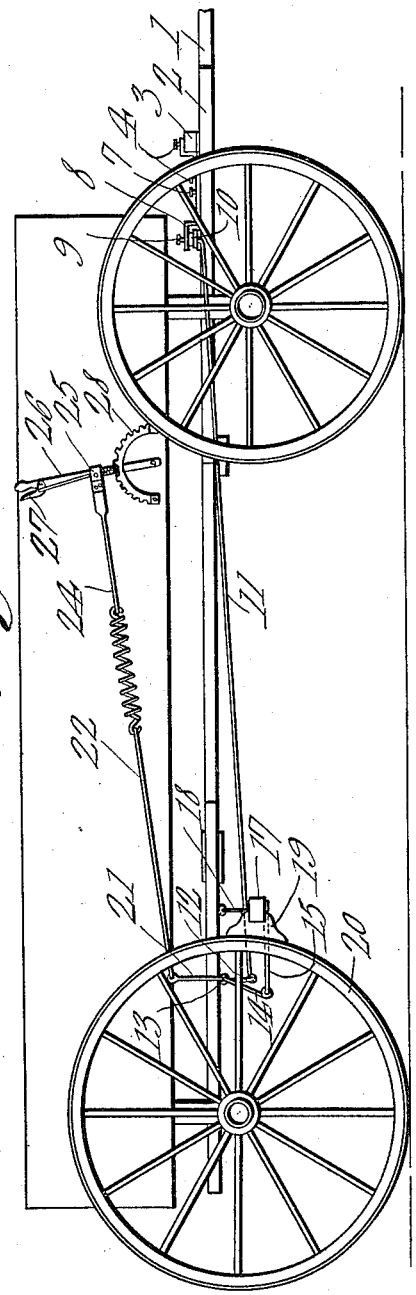
John T. Flight, Inventor
by C. A. Snow & Co., Attorneys
Witnesses

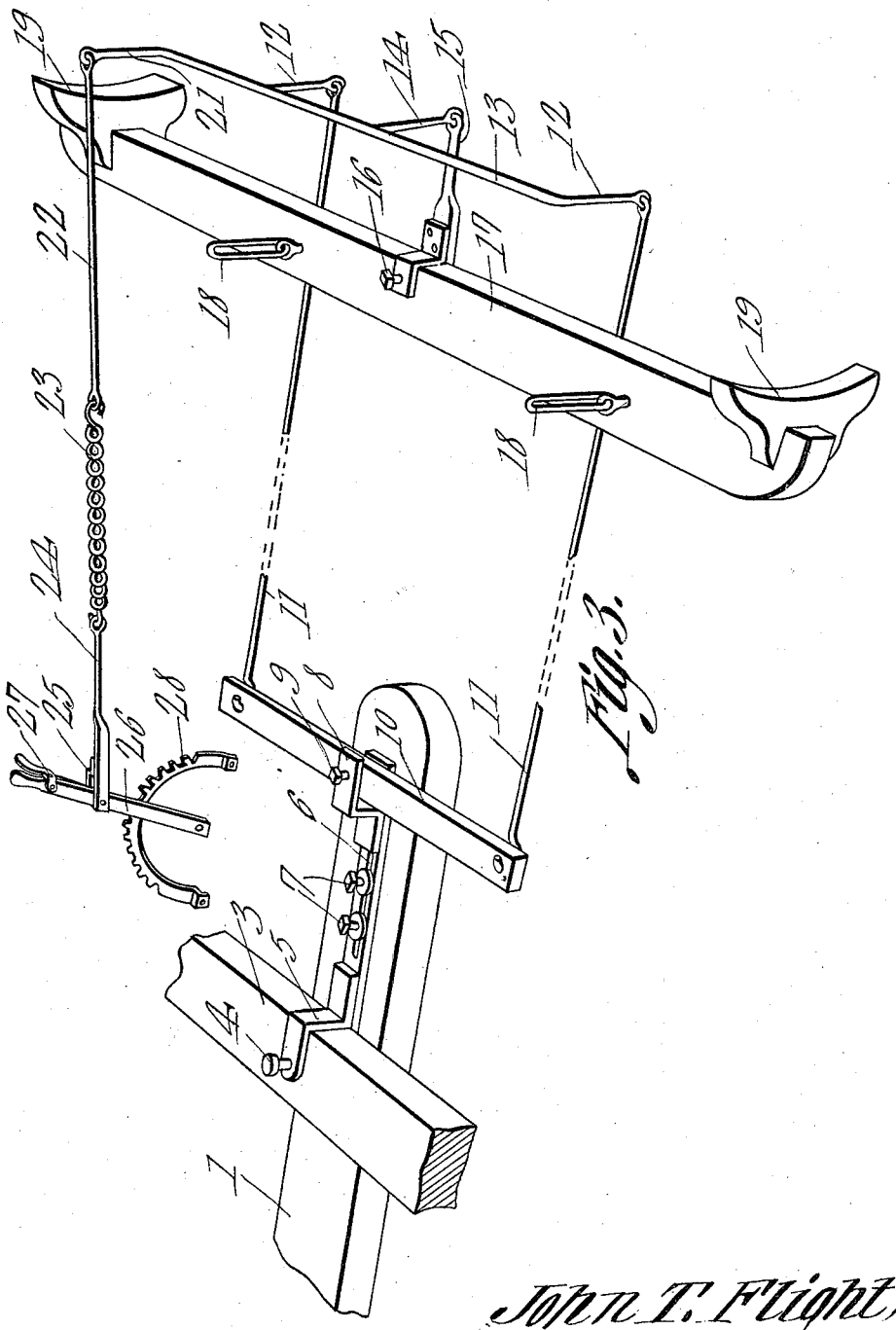

UNITED STATES PATENT OFFICE.

JOHN T. FLIGHT, OF CLEVELAND, OKLAHOMA.

AUTOMATIC BRAKE FOR VEHICLES.

1,029,860.   Specification of Letters Patent.   Patented June 18, 1912.

Application filed October 10, 1911. Serial No. 653,881.

*To all whom it may concern:*

Be it known that I, JOHN T. FLIGHT, a citizen of the United States, residing at Cleveland, in the county of Pawnee and State of Oklahoma, have invented a new and useful Automatic Brake for Vehicles, of which the following is a specification.

The present invention relates to improvements in automatic brakes for vehicles, the primary object of the present invention being the provision of a brake operably connected to the tongue or draft mechanism of a vehicle and provided with a spring actuated and adjustable device working in opposition to the pull upon said draft device to normally hold the brake beam so that the shoes thereof will be in braking engagement with the wheels of the vehicle, the pull upon the draft device exerting in an opposite direction to release the spring tension upon the brake beam and consequently remove the brake shoes from engagement with the wheels, the brake beam automatically setting upon the release of the pull upon the draft devices.

A further object of the present invention is the provision of an adjustable automatic brake for vehicles, which is normally held in braking position and provided with an adjustable manually operated device for increasing or decreasing the tension of the spring to regulate the pull necessary upon the draft device to release the brake and draw the vehicle, said adjustable spring actuated device being so constructed and disposed as to act automatically upon the release or decrease of draft pull upon the draft devices of the vehicle, thus automatically setting the brake and when under pulling strain to exert the proper tension to retain the traces or tugs and various draft devices of the harness and otherwise in a taut condition.

With the foregoing and other objects in view which will appear as the description proceeds, the invention resides in the combination and arrangement of parts and in the combination of parts and in the details of construction hereinafter described and claimed, it being understood that changes in the precise embodiment of invention herein disclosed can be made within the scope of what is claimed without departing from the spirit of the invention.

In the drawings Figure 1 is a side elevation of a farm wagon equipped with this device. Fig. 2 is a top plan view of running gear of said wagon with the automatic brake in operable relation. Fig. 3 is a perspective view of the brake mechanism removed from its connection with the wagon but in operable position.

Referring to the drawings, the numeral 1 designates the tongue of the wagon which is connected in the tongue hounds 2 while connected to said tongue for longitudinal sliding movement is a double tree 3, which by reason of the pin 4 is connected to the forward end 5 of the sliding bar which is provided with a longitudinal groove or slot 6 through which pass the two bolts 7 which connect the said plate slidably to the upper face of the rear end of the tongue 1 within the space between the tongue hounds. The rear end of the sliding bar as at 8 is connected by a pin 9 intermediate of the ends to the brake actuating bar 10, which has connected to its terminals and extending rearwardly of the running gear of the vehicle two parallel bars or rods 11, whose rear ends are pivotally connected to the brake actuating bar or shaft 13 which is journaled transversely of the running gear and is provided with the downwardly projecting centrally disposed arm 14 whose lower end is pivotally connected to the rear end of the rod 15, whose forward end is connected, as at 16, centrally of the brake beam 17, the said brake beam 17 being provided with the two suspending flexible connections 18 and with the brake shoes 19 which are disposed in operable relation with the rear wheels 20 of the vehicle. By this construction it will be seen that any pull upon the double tree 3 will pull the bar 10 forwardly and consequently the rods 11 which will actuate the shaft 13 so as to push the brake beam 17 with its shoes 19 forwardly and out of engagement with the tires of the wheels 20, but in order to normally hold the said brake shoes 19 in engagement with the wheels 20 a crank 21 which is oppositely disposed to the crank 12 of the shaft 13 at one end thereof has connected flexibly thereto a link 22, whose forward end is connected to one end of the spiral spring 23, which is connected at its forward end to the link or rod 24, which is pivotally connected as at 25 to the manually controlled lever 26, which is provided with the handle and pawl device 27 which is in operable relation to the toothed segment 28 connected to the body of the wagon. By this means it will be seen that the lever 26 may be adjusted with relation to the toothed segment 28 so as to extend the spring 23 to the proper tension according to the load being carried in the wagon, and that said spring 23 will exert a tension upon the crank 21 so as to pull the arm 14 rearwardly and thereby the brake beam 17 so that the shoes 19 thereof will be automatically held in engagement with the wheels 20, thus providing a means to "set" the brake at all times when the wagon is at rest or the pulling tension upon the double tree 3 is lessened.

In practice when the wagon is carrying say a ton, the teamster will set the brake 26 at a notch upon the segment 28 which would indicate 1900 lbs. pull necessary to overcome the tension of the spring 23 and release the brake shoes 19 from the wheels 20, and where the pull upon the tongue and double tree fall below that amount the said spring 23 will automatically set the brake. By this means it is evident that the draft animals instead of pulling against the solid pull as would be the case if the double tree was hitched to the hounds, that they pull against a counter acting spring such as at 23, which serves to retain the collars upon the draft animals in a taut condition, relieving the pressure on the collars of all jar liable to bruise the shoulders of the animal, retaining the tugs in such condition as to prevent the accidental unhooking thereof, and providing a draft equalizing device to take care of the roughness or undulations in the road.

What is claimed is:

The combination with a vehicle running gear, of an automatic brake for the rear wheels thereof, comprising a brake beam disposed for swinging movement to and from the rear wheels, a transversely disposed rock shaft mounted to the rear of the brake beams, three depending arms carried by said rock shaft, a link connecting the center arm to the brake beam, an arm carried upon one end of the rock shaft and extending in an opposite direction to the three arms, a ratchet-and-pawl-locked and manually operated lever, a connection between said lever and last arm of the rock shaft, said connection being provided with a spring forming a portion thereof, said spring normally actuating the rock shaft to hold the brake beam in wheel engagement, tongue mounted in the forward hounds of the running gear, a double tree supporting means slidably carried by the tongue, a bar pivoted intermediate of its ends to the tongue through said means, and two rods having their forward ends connected to the ends of said bar and their rear ends connected to the outer depending arm of the rock shaft.

In testimony that I claim the foregoing as my own, I have hereto affixed my signature in the presence of two witnesses.

JOHN T. FLIGHT.

Witnesses:
JOHN W. BERTENSHAW,
MELVIN W. THOMASON.